(12) United States Patent
Gundabathula

(10) Patent No.: US 11,356,296 B1
(45) Date of Patent: Jun. 7, 2022

(54) SYSTEM AND METHOD FOR INDEPENDENT BINDING OF VIRTUAL NETWORKS OVERLAY USING A PHYSICAL NETWORK TOPOLOGY

(71) Applicant: Quantum Networks (SG) Pte. Ltd., Singapore (SG)

(72) Inventor: Satish Gundabathula, Irving, TX (US)

(73) Assignee: Quantum Networks (SG) Pte. Ltd., Singapore (SG)

(*) Notice: Subject to any disclaimer, the term of this patent is extended or adjusted under 35 U.S.C. 154(b) by 0 days.

(21) Appl. No.: 17/389,401

(22) Filed: Jul. 30, 2021

(51) Int. Cl.
| | | |
|---|---|---|
| H04L 45/02 | (2022.01) | |
| H04L 45/122 | (2022.01) | |
| H04L 45/18 | (2022.01) | |
| H04L 45/16 | (2022.01) | |
| H04L 45/42 | (2022.01) | |
| H04L 12/46 | (2006.01) | |
| H04L 45/64 | (2022.01) | |
| H04L 41/12 | (2022.01) | |
| H04L 69/16 | (2022.01) | |
| H04L 67/141 | (2022.01) | |

(52) U.S. Cl.
CPC .......... H04L 12/4641 (2013.01); H04L 41/12 (2013.01); H04L 45/64 (2013.01); H04L 67/141 (2013.01); H04L 69/16 (2013.01); H04L 2212/00 (2013.01)

(58) Field of Classification Search
CPC ..... H04L 12/4641; H04L 41/12; H04L 45/64; H04L 67/141; H04L 69/16
See application file for complete search history.

(56) References Cited

U.S. PATENT DOCUMENTS

| | | | |
|---|---|---|---|
| 8,443,065 B1 * | 5/2013 | White | H04L 12/4625 709/227 |
| 2011/0110268 A1 | 5/2011 | Panasyuk et al. | |
| 2013/0332602 A1 * | 12/2013 | Nakil | H04L 43/10 709/224 |
| 2016/0119165 A1 * | 4/2016 | Keronen | H04W 72/02 370/254 |
| 2016/0218884 A1 | 7/2016 | Ebrom et al. | |
| 2017/0331669 A1 * | 11/2017 | Ganesh | H04L 41/0226 |
| 2019/0364419 A1 * | 11/2019 | Stammers | H04W 76/12 |
| 2020/0220746 A1 | 7/2020 | Shribman et al. | |

FOREIGN PATENT DOCUMENTS

CN 104639372 B 11/2018

* cited by examiner

*Primary Examiner* — Christopher B Robinson
(74) *Attorney, Agent, or Firm* — Jason C. Cameron

(57) ABSTRACT

A system for an independent binding of virtual networks overlay using a physical network topology is disclosed. The system includes a plurality of network elements associated with a corresponding plurality of peers. The plurality of network elements creates a virtual network and enable corresponding applications to bind the virtual network to a physical network. The system includes a network agent to establish communication channel between at least two network elements from the plurality of network elements, where a network element from a set of at least two network elements is configured to identify status of the one or more physical network. The network element is also configured to relay one or more data packets to another network element from a set of at least two network elements in the physical network using a user datagram protocol based on the status of the one or more physical network identified.

14 Claims, 12 Drawing Sheets

SYSTEM AND METHOD FOR INDEPENDENT BINDING OF VIRTUAL NETWORKS OVERLAY USING A PHYSICAL NETWORK TOPOLOGY

FIELD OF INVENTION

Embodiments of the present disclosure relate to network communication, and more particularly to, a system and a method for an independent binding of virtual networks overlay using a physical network topology.

BACKGROUND

Communication in today's world has become very fundamental. Networks have evolved since its advent, with the introduction of network address translators (NATs) to address the limitation of addressing, to the introduction of IPV6. The applications on any device will need to be able to communicate with each other and be able to traverse NATs. NAT is an Internet standard that enables a local area network (LAN) to use of one set of private IP addresses for internal traffic and a second set of global IP addresses for external traffic. Many protocols have been introduced to address this problem but mainly from communication point of view such as audio or video calls. Cloud infrastructure with client server architectures have been deployed with TCP and have been used to solve the problem of application interactivity introducing single point of failures. However, the question of traversing NATs is still the biggest issue that needs to be solved.

Currently, the NAT is a major obstacle to end-user applications that desire to communicate with other applications across public networks such as the Internet. Thus, several types of NAT traversal mechanisms have been employed to ease such burdens on the user. Traversal Using Relays around NAT (TURN) is one of many protocols that assist applications to traverse NATs. With respect to TURN, instead of establishing a direct connection between any two peers which are behind the NAT, both peers connect to a well-known server, which relay messages between them. Relay has the advantage that it works as long as the server is accessible for both clients. However, this places an undue processing and network burden on relay servers that act as intermediaries between peers. The delay between the clients may increase as well.

Another set of techniques include Simple Traversal of UDP through NAT (STUN) and Teredo which is designed to traverse IPv6 protocols across NAT. Through STUN/Teredo, two clients behind Cone-NAT may establish direct connection by using a well-known server to relay initial connection messages, and to identify the public remapped source application TCP or UDP port for the NAT of each client. However, these protocols and others do not traverse symmetric-NAT type systems. Also, some of the techniques enables changes in the applications and their corresponding code base.

Hence, there is a need for an improved system and a method for an independent binding of virtual networks overlay using a physical network topology to address the aforementioned issue(s).

BRIEF DESCRIPTION

In accordance with an embodiment of the present disclosure, a system for an independent binding of virtual networks overlay using a physical network topology is provided. The system includes a plurality of network elements associated with a corresponding plurality of peers. The plurality of network elements is configured to create a virtual network and enable corresponding applications to bind the virtual network to a physical network. The system includes a network agent configured to establish communication channel between at least two network elements from the plurality of network elements, where a network element from a set of at least two network elements is configured to identify status of the one or more physical network. The network element is also configured to relay one or more data packets to another network element from a set of at least two network elements in the physical network using a user datagram protocol based on the status of the one or more physical network identified.

In accordance with another embodiment of the present disclosure, a system for an independent binding of virtual networks overlay using a physical network topology is provided. The system includes a plurality of network elements associated with a corresponding plurality of peers. The plurality of network elements is configured to create a virtual network and enable a corresponding application to bind the virtual network to a physical network. The system includes a network agent configured to establish communication channel between at least two network elements from the plurality of network elements, where a network element from a set of at least two network elements is configured to perform a client server protocol request to a client server to obtain one or more physical network characteristics. The network element is also configured to identify status of the one or more physical network characteristics. The network element is further configured to relay one or more data packets to another network element from a set of at least two network elements when the status comprises port restricted path, restricted path or symmetric path. The network element is further configured to send a registration request to central repository via a signaling protocol when the status comprises restricted path. The network element is further configured to send a resource allocation request to the network agent for another network element from a set of at least two network elements upon receiving acknowledgement of the registration request. The network element is further configured to obtain a physical address mapped between the set of at least two network elements by the network agent upon obtaining a response of the resource allocation request from the network agent. The network element is configured to encapsulate the one or more packets in UDP, by utilizing the physical address, as a payload. The network element is further configured to relay one or more data packets, by using the physical network, to another network element from a set of at least two network elements, wherein each of a set of at least two network elements strip and relay the payload to the corresponding application for communication to be established.

In accordance with yet another embodiment of the present disclosure, a method for an independent binding of virtual networks overlay using a physical network topology is provided. The method includes providing a plurality of network elements associated with a corresponding plurality of peers. The method also includes creating, by a plurality of network elements, a virtual network and enable corresponding applications to bind the virtual network to a physical network. The method further includes establishing, by a network agent, communication channel between at least two network elements from the plurality of network elements. The method further includes identifying, by a network element from a set of at least two network elements, status of the one or more physical network. The method further includes relaying, by the network element from a set of at least two network elements, one or more data packets to another network element from a set of at least two network elements in the physical network using a user datagram protocol based on the status of the one or more physical network identified.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
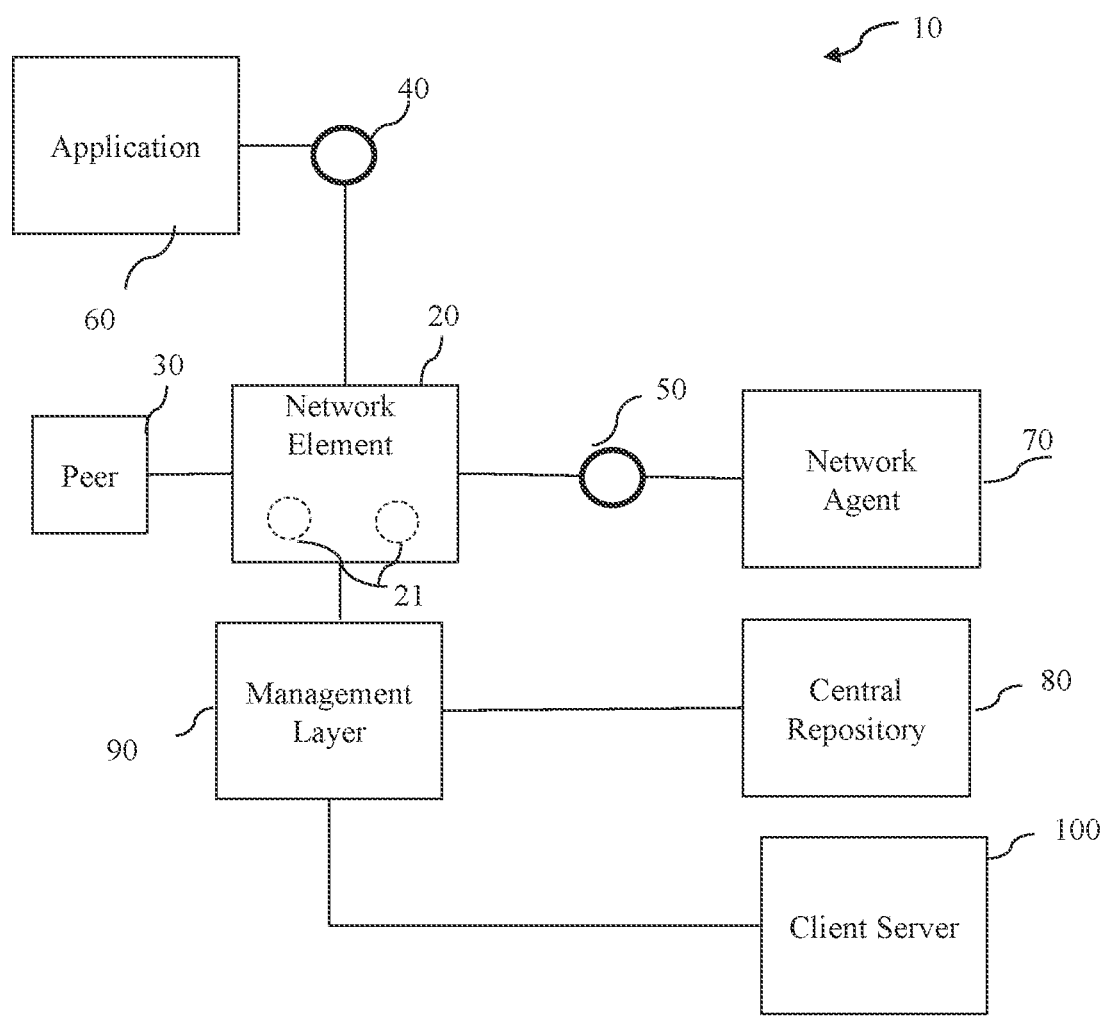
FIG. 1 is a block diagram representation of a system for an independent binding of virtual networks overlay using a physical network topology in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to system and method for an independent binding of virtual networks overlay using a physical network topology. As used herein, virtual network is a network where all devices, servers, virtual machines, and data centers that are connected are done so through software and wireless technology. Similarly, physical network topology is the placement of the various components of a network and the different connectors usually represent the physical network cables, and the nodes represents usually the physical network devices. The system for an independent binding of virtual networks overlay using a physical network topology is described in detail from FIG. 1 onwards.

FIG. 1 is a block diagram representation of a system 10 for an independent binding of virtual networks overlay using a physical network topology in accordance with an embodiment of the present disclosure. The system 10 includes a plurality of network elements 20 associated with a corresponding plurality of peers 30. As used herein, a peer is a node or a computer within a network that is configured to perform one or more functionalities for example, two desktop PCs in a network are peers. The plurality of network elements 20 is configured to create a virtual network 40 and enable corresponding applications to bind the virtual network to a physical network 50. The virtual network 40 is created for the corresponding applications 60 to be able to communicate. The virtual networks 40 cannot be used to traverse the physical network 50. As used herein, application is a computer program designed to carry out a specific task other than one relating to the operation of the computer itself, typically to be used by end-users. The applications 60 behind different network elements 20 may communicate with each other using the physical network 50. Furthermore, the system 10 includes a network agent 70 which is configured to establish communication channel between at least two network elements 21 from the plurality of network elements. As used here, the set of at least two network elements are those network elements among the plurality of network elements which wants to communicate with each other or sends/receive data packets between each other. In one embodiment, the network agent 70 is configured to relay one or more data packets between a set of at least two network elements 21 using a binding address. As used herein, data packet is a unit of data made into a single package that travels along a given network path. Data packets are used in internet protocol (IP) transmissions for data that navigates the web, and in other kinds of networks. The set of at least two network elements 21 contact the network agent 70 on the network to obtain the binding address for relaying the one or more data packets.

Additionally, a network element 22 from a set of at least two network elements 21 is configured to register with a central repository 80 via a signaling protocol. In one embodiment, the signaling protocol may include REST, web sockets, SIP or XMPP. The central repository 80 is configured to track registration of the plurality of network elements 20 for discovery and connectivity. The system 10 further includes management layer 90 which uses APIs to establish the physical network path for the network element 22 to communicate with another network element 23 in the virtual network 40. Further, the set of at least two network elements 21 are configured to perform a client server protocol request to a client server 100 to obtain one or more physical network characteristics, where the client server may include a session traversal utility for NAT (STUN) server. As used herein, STUN is a standardized set of methods, including a network protocol, for traversal of network address translator (NAT) gateways in applications of real-time voice, video, messaging, and other interactive communications. STUN is a tool used by other protocols, such as interactive connectivity establishment (ICE), or the like. STUN provides a tool for hosts to discover the presence of a network address translator, and to discover the mapped, usually public, Internet Protocol (IP) address and port number that the NAT has allocated for the application's User Datagram Protocol (UDP) flows to remote hosts. The protocol requires assistance from the client server (STUN server) located on the public side of the NAT, usually the public Internet. Similarly, as used herein, Network address translation (NAT) is a method of mapping an IP address space into another by modifying network address information in the IP header of packets while they are in transit across a traffic routing device. As network address translation modifies the IP address information in packets, NAT implementations may vary in their specific behavior in various addressing cases and their effect on network traffic.

Figure 2:
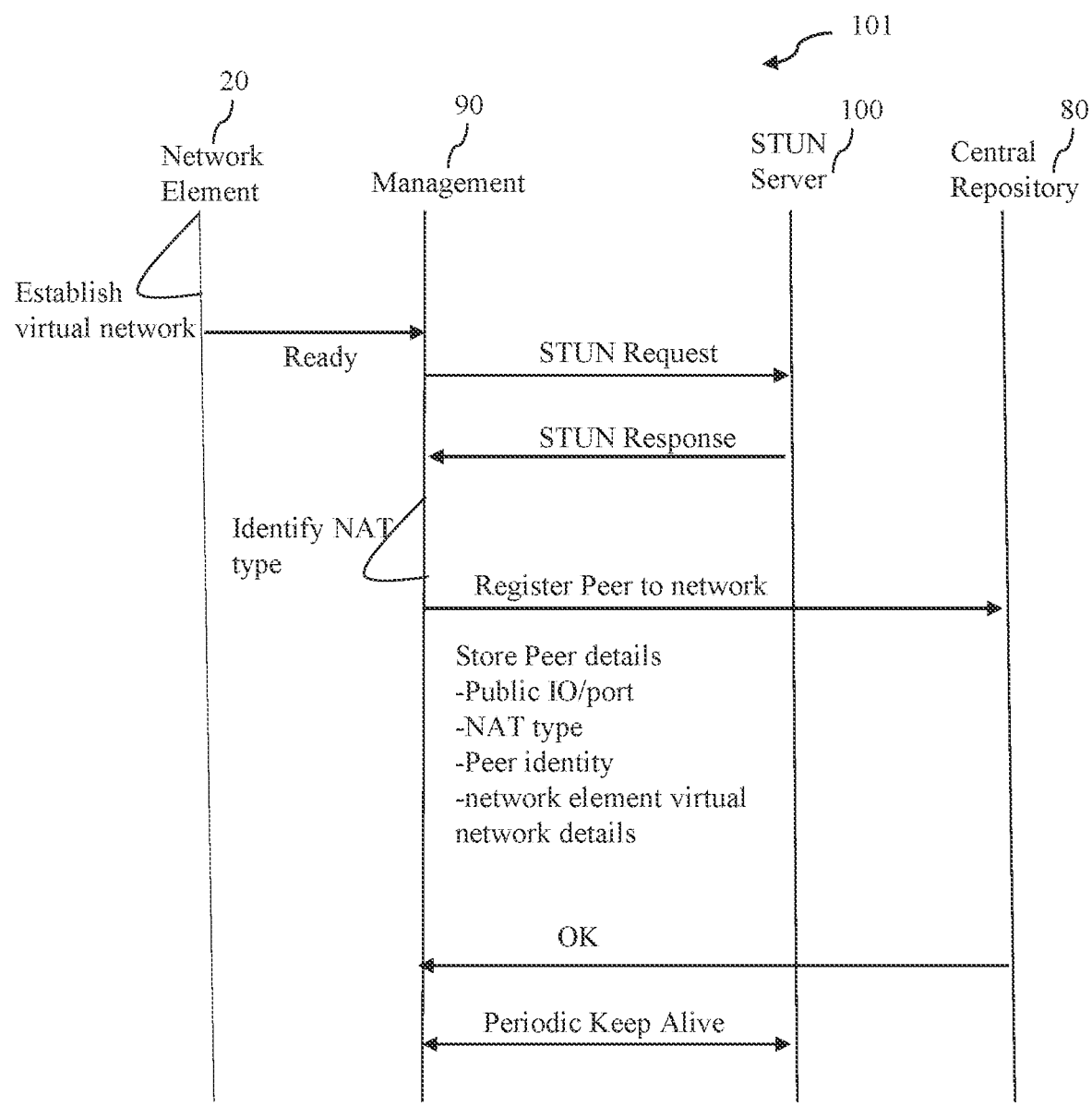
FIG. 2 is a schematic representation of one embodiment of the system of FIG. 1 depicting registration process of the network element in accordance with an embodiment of the present disclosure.

FIG. 2 is a schematic representation of one embodiment of the system 10 of FIG. 1 depicting registration process 101 of the network element in accordance with an embodiment of the present disclosure. The network element 22 before registration performs a STUN request to a STUN server 100 to obtain the physical network characteristic including the public IP/port, type of NAT (cone, restricted cone, port restricted cone, symmetric NAT) or PATs. The network element 22 registers with a central repository 80 via REST, web sockets, SIP or XMPP. The central repository 90 keeps track of registration of the plurality of network element for discovery and connectivity. The REST APIs are supported by the network agent 70. The management layer 90 uses such APIs to establish a physical network path for the network element 22 to communicate with another network element in the virtual network. To setup a session the peer must call a unique ID to identify a session initiated by a peer, the public IP of the source peer, the public port of the peer, the public IP of the peer to which communication is required and the public port of the destination peer. In response, the network element 22 obtains the public IP address of the network agent and the port allocated by the network agent to relay traffic.

In one case, to setup partial session when peer do not have information of other peer, the REST APIs such as a unique ID to identify a session initiated by a peer, the public IP of the source peer, the public port of the peer is obtained. In response, the peer obtains the public IP address of the network agent and the port allocated by the network agent to relay traffic. In another case, to complete connectivity for peers that have established a partial session the REST API such as the public IP of the peer to which communication is required and the public port of the destination peer can be used to patch the session. The URL must contain the session identifier returned during the allocate API. In yet another case, to upgrade a peer's source IP address and port during network change, the REST API such as the public IP of the source peer and the public port of the endpoint can be invoked to upgrade the session. The URL must contain the session identifier returned during the allocate API.

Figure 3:
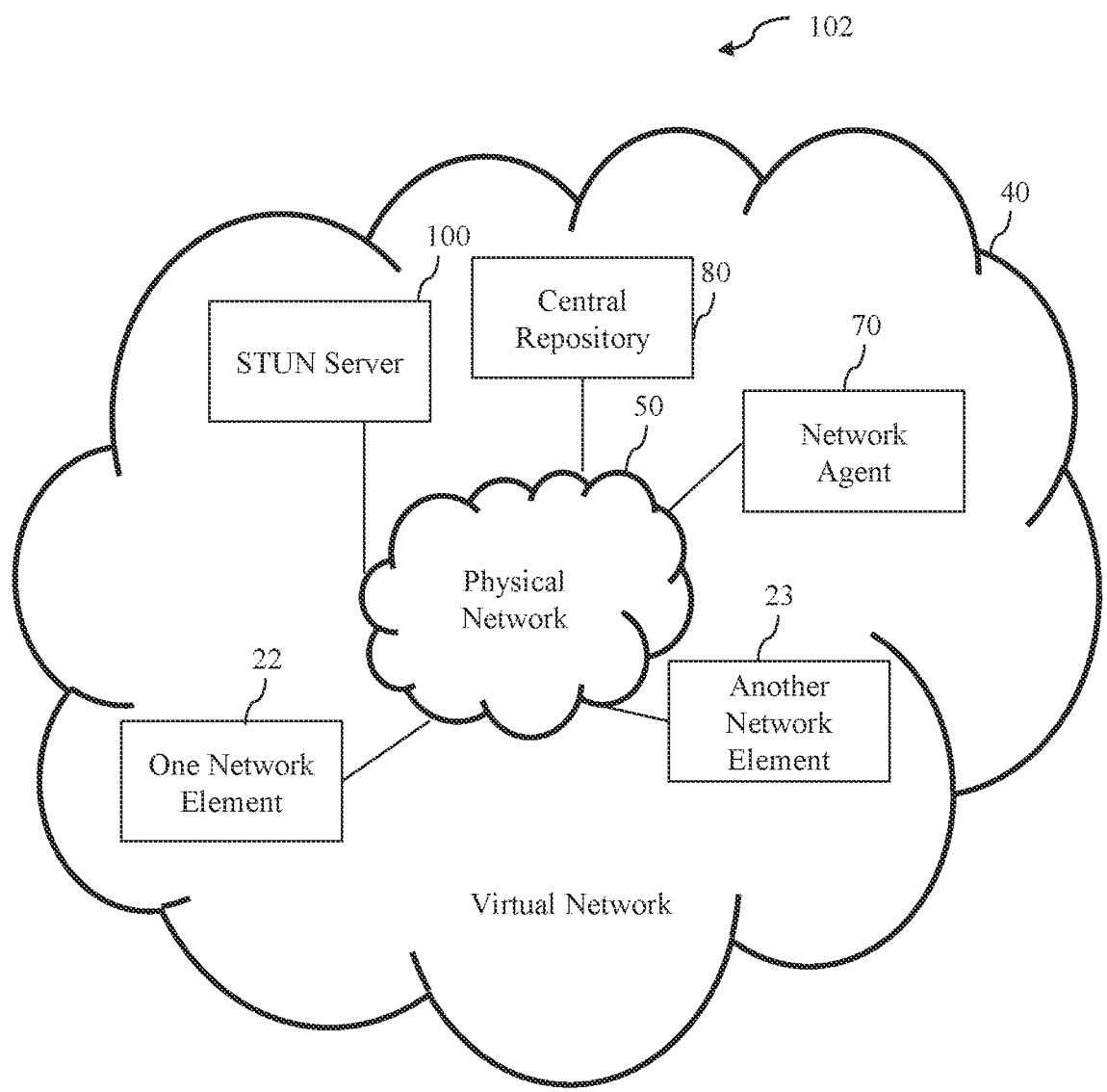
FIG. 3 is a schematic representation of another embodiment of the system of FIG. 1 depicting NAT traversal process in accordance with an embodiment of the present disclosure.

FIG. 3 is a schematic representation of another embodiment of the system 10 of FIG. 1 depicting NAT traversal process 102 in accordance with an embodiment of the present disclosure. Once the network element 22 from a set of at least two network elements determine the type of NAT, if a there is a clear path for any network element to communicate, the one or more data packets are relayed from one network element 22 to another network element 23. In a case where the NAT is of type port restricted, restricted cone, full cone or symmetric, the one or more data packets cannot be routed directly between them. As used herein, restricted cone NAT is one where all requests from the same internal IP address and port are mapped to the same external IP address and port. Similarly, port restricted cone NAT is like a restricted cone NAT, but the restriction includes port numbers. Specifically, an external host can send a packet, with source IP address and source port P, to the internal host only if the internal host had previously sent a packet to IP address X and port P. The full cone NAT is one where all requests from the same internal IP address and port are mapped to the same external IP address and port. Furthermore, any external host can send a packet to the internal host, by sending a packet to the mapped external address. Moreover, symmetric NAT is one where all requests from the same internal IP address and port to a specific destination IP address and port, are mapped to the same external IP address and port. If the same host sends a packet with the same source address and port, but to a different destination, a different mapping is used. Furthermore, only the external host that receives a packet can send a UDP packet back to the internal host.

In such scenario, the network element 22 contacts the network agent 70 on the network. Further, a request is sent to the network agent 70 via REST, web sockets, SIP, XMPP or any other signaling protocol to obtain a binding address for relaying data packets. The network agent 70 maintains a physical address mapping between a set of at least two network elements, the network agent 70 relays the one or more data packets between a set of at least two network elements using the binding address. For the set of at least two network elements to communicate to each other, the network element 22 needs a unique binding address. This also allows for security, ensuring that the only two parties that share this channel are the network elements that have been authorized to communicate. Additional security layer may be negotiated on the channel established by the network agent. Each network element in conjunction with the central repository 80 may establish the set of rules. In one embodiment, the set of rules may be associated with rules which helps to identify that which network elements can communicate. The set of at least two network elements that need to communicate with each other are identified based on a token, duration or any other rule that may be predefined to allow for this communication to be established. Only network elements that can communicate will leverage the network agent 70 for packet flow. Once a session between the set of at least two network elements is terminated, the network agent 70 is informed to remove the binding address. At this point, no more communication can take place between the network elements using the network agent. During this time, if the network elements change the corresponding physical network 50 such as in mobile devices, the network elements may inform the network agent 70 about a change in the network element's physical address. The network agent 70 makes the relevant change in corresponding state machine to allow for an updated physical address to be used for the communication and purge a previous mapping. The previous mapping refers to a former association of the network elements with the binding agent within the physical network using one or more corresponding binding addresses.

Figure 3A:
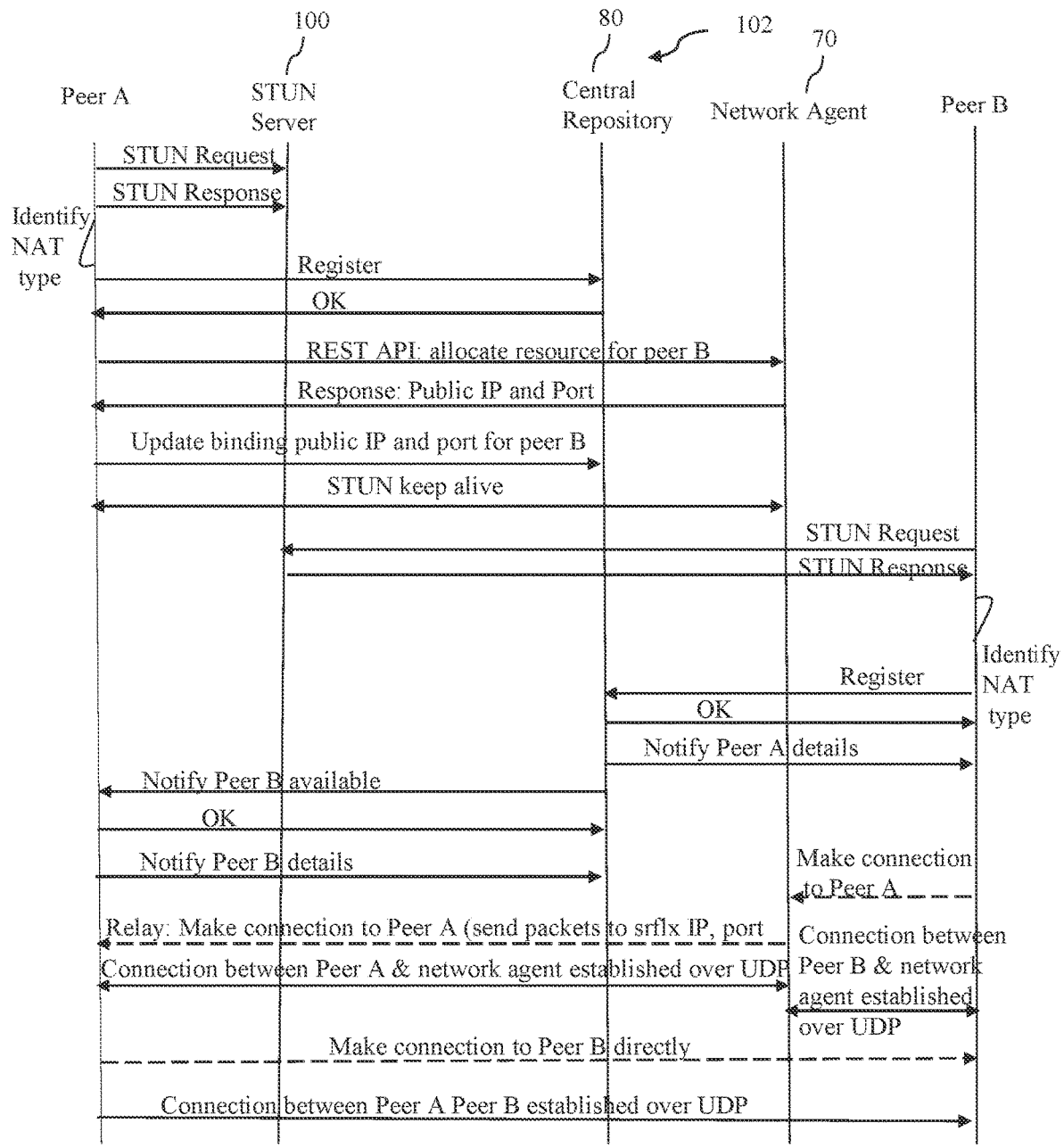
FIG. 3(a) is a schematic representation of yet another embodiment of the system of FIG. 1 depicting NAT traversal process in a specific condition in accordance with an embodiment of the present disclosure.

Considering the aforementioned process 102, a scenario is described in FIG. 3(a) where peer A and peer B wants to communicate and peer A is behind restricted NAT and Peer B is on no NAT. The peer A sends a STUN binding request to STUN server 100 in order to obtain the physical network characteristic as a response from the STUN server. Upon identification of type of NAT, the peer A sends a registration request to the central repository 80. Upon registration, the peer A sends a request to allocate resource for the peer B to network agent 70 and in response, the network agent 70 sends public IP and port of peer B. Further, the peer A sends update for binding public IP and port for peer B to the central repository 80. As a result, a connection is established between the peer A and the network agent. Similarly, to establish communication with the peer A, the peer B sends STUN binding request to the STUN server 100 and obtain the physical network characteristic as a response from the STUN server. Upon identification of type of NAT, the peer B sends a registration request to the central repository 80. Upon registration, the central repository 80 notifies peer B about the details of peer A. Subsequently, the central repository 80 notifies peer A about the availability of peer B and peer A obtains peer B details from central repository 80. In a case where the peer B wants to communicate with peer A, the peer B will send all the data packets to the network agent 70, where the network agent 70 will reply to the data packets to peer A. The connection between peer A and network agent 70 established over the user datagram protocol (UDP). In another case where peer A wants to communicate with peer B, the peer A can send all the data packets to per B directly, since peer B is not behind any NAT and allows packet traffic to flow.

Figure 4:
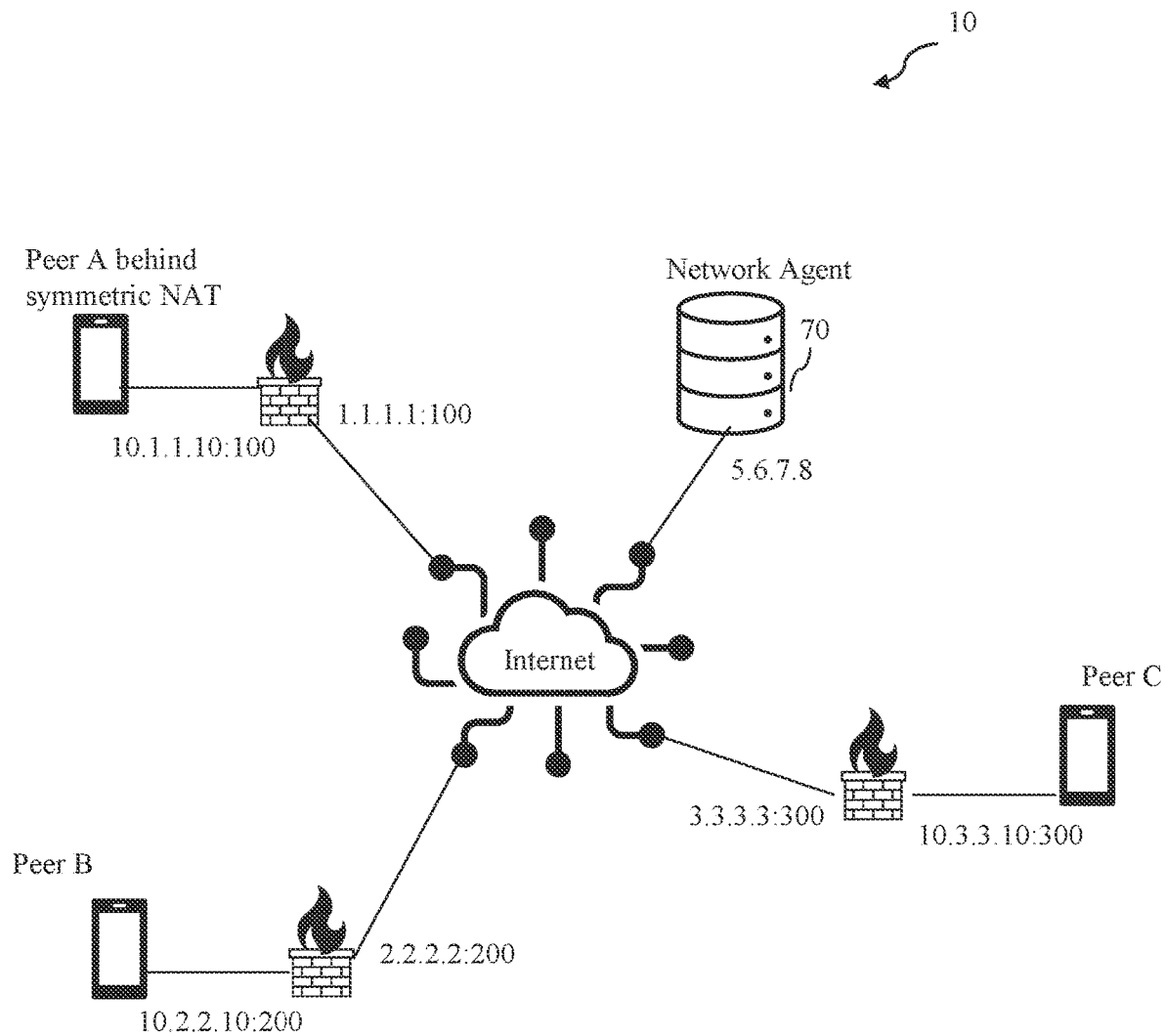
FIG. 4 is a schematic representation of an exemplary embodiment of the system of FIG. 1 in accordance with an embodiment of the present disclosure.

FIG. 4 is a schematic representation of an exemplary embodiment of the system 10 of FIG. 1 in accordance with an embodiment of the present disclosure. Considering an example where one of the peers is behind a symmetric NAT (Peer A) and needs to communicate with another peer behind regular NATs (Peer B). For every peer behind regular NAT that the peer behind symmetric NAT wants to communicate with, a session needs to be established with the server 100. The peer behind symmetric NAT needs to send a STUN pinhole packet for each peer on regular NAT to the server defined by a binding port. Peer A needs to establish a unique session with each of the Peer B and Peer C if communication needs to be established with them. The network agent 70 allocates a binding port that will be used for communication for each session such as A from/to B and A from/to C. Below is the mapping table for this communication to be established:

| Source Peer | Destination Peer | Binding IP | Binding Port |
| --- | --- | --- | --- |
| A | B | 5.6.7.8 | 20000 |
| A | C | 5.6.7.8 | 20001 |

There are two possible scenarios for operating the platform. Peer B and Peer C register with the platform first followed by Peer A, and conversely Peer A registers before Peer B and Peer C. Considering the first scenario where Peer B and/or Peer C register first followed by Peer A. In this case since network information for Peer B and C are available, Peer A can send the full allocate request to establish a session. In another scenario where Peer A registers first followed by peer B and/or Peer C, since network information for Peer B and Peer C are not available, Peer A can only send a partial allocate request. Once Peer B and/or Peer C register, Peer A can update the session with the network information of Peer B and Peer C to establish a complete session. Once Peer B and/or Peer C register, Peer A can complete the session establishment by issuing an update session request. On success a "200 Ok" response is sent.

Figure 5:
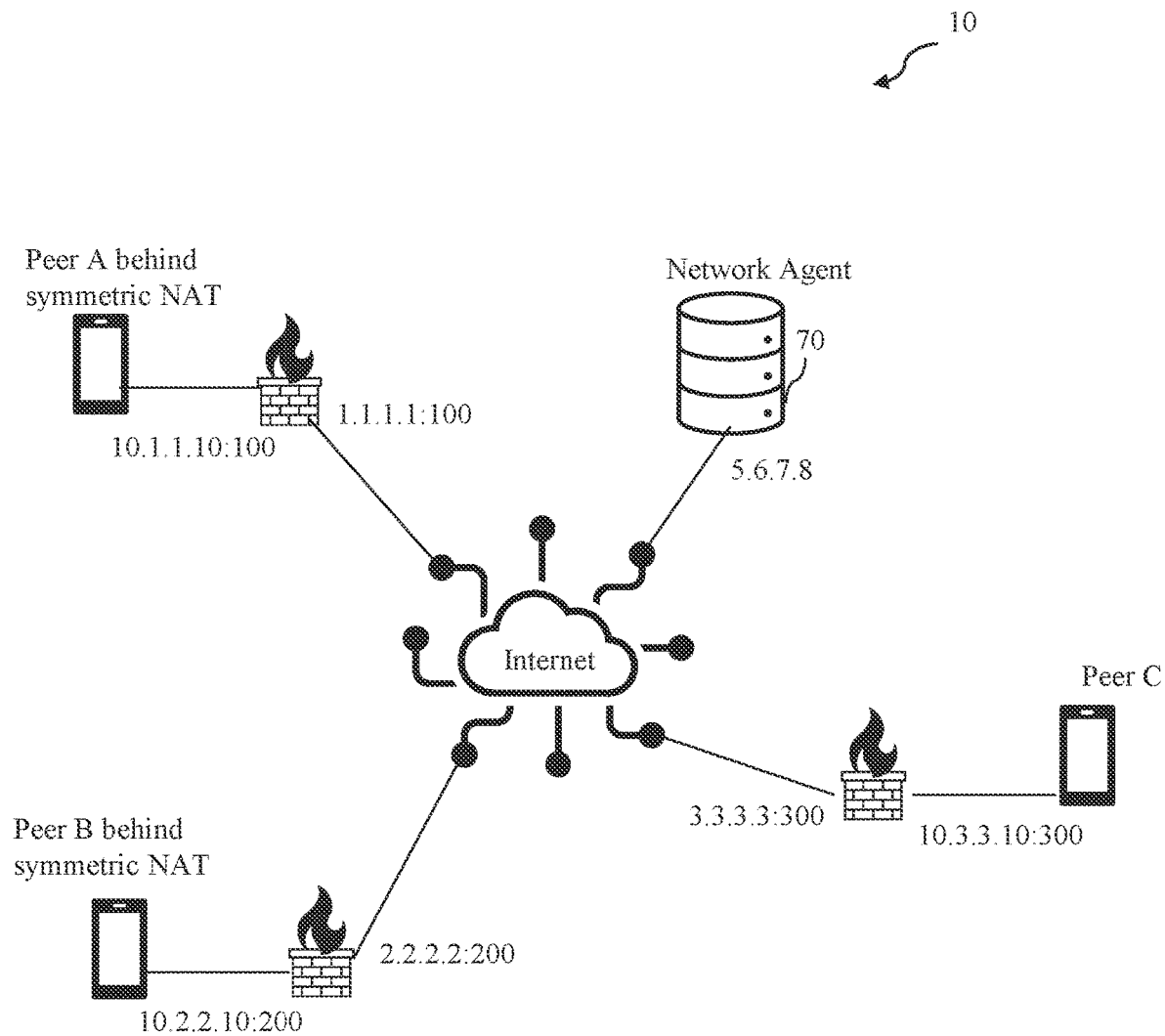
FIG. 5 is a schematic representation of another exemplary embodiment of the system of FIG. 1 in accordance with an embodiment of the present disclosure.

FIG. 5 is a schematic representation of another exemplary embodiment of the system 10 of FIG. 1 in accordance with an embodiment of the present disclosure. Considering a scenario where one of the peers is behind a symmetric NAT (Peer A) needing to communicate with another peer also behind symmetric NAT (Peer B). For every peer behind symmetric NAT that the peer behind symmetric NAT wants to communicate with, a session needs to be established with the server 100. The peer behind symmetric NAT needs to send a STUN pinhole packet for each peer on symmetric NAT to the server defined by the binding port. Peer A and Peer B needs to establish a unique session with Peer B if communication needs to be established with them. Similarly, Peers A and Peer B have also to establish unique sessions for a communication channel to be established. The network agent 70 will allocate a binding port that will be used for communication for each session such as Peer A, Peer B from/to Peer C and Peer A to Peer B, Peer B to Peer A. Below is the mapping table for this communication to be established:

| Source Peer | Destination Peer | Binding IP | Binding Port |
|---|---|---|---|
| A | C | 5.6.7.8 | 20000 |
| B | C | 5.6.7.8 | 20001 |
| A | B | 5.6.7.8 | 40001 |
| B | A | 5.6.7.8 | 40002 |

In the case of symmetric NATs, since port binding for every destination is different, a complete request cannot be established, and a two-step process is followed such as a partial request and an update request to complete the establishment for a communication session. Considering a case where Peer B registers first followed by Peer A. In this case since network information for Peer B is available, Peer A can send the full allocate request to establish a session. Moreover, the destination port for request from A must be binding port assigned for Peer B to Peer A communication. Considering another scenario where Peer A registers first followed by Peer B. In this case since network information for Peer A is available, Peer B can send the full allocate request to establish a session. The destination port for request from B must be binding port assigned for Peer A to Peer B communication. Considering yet another scenario, where Peer A or Peer B registers first followed by Peer B or Peer A. In this case since network information for Peer A or Peer B are not available, Peer A or Peer B can only send a partial allocate request. Once Peer A or Peer B registers, Peer A or Peer B can update the session with the network information of Peer B or Peer A to establish a complete session. Once Peer A or Peer B registers, Peer B or Peer A can complete the session establishment by issuing an update session request. On success, a "200 Ok" response is sent.

Figure 6A:
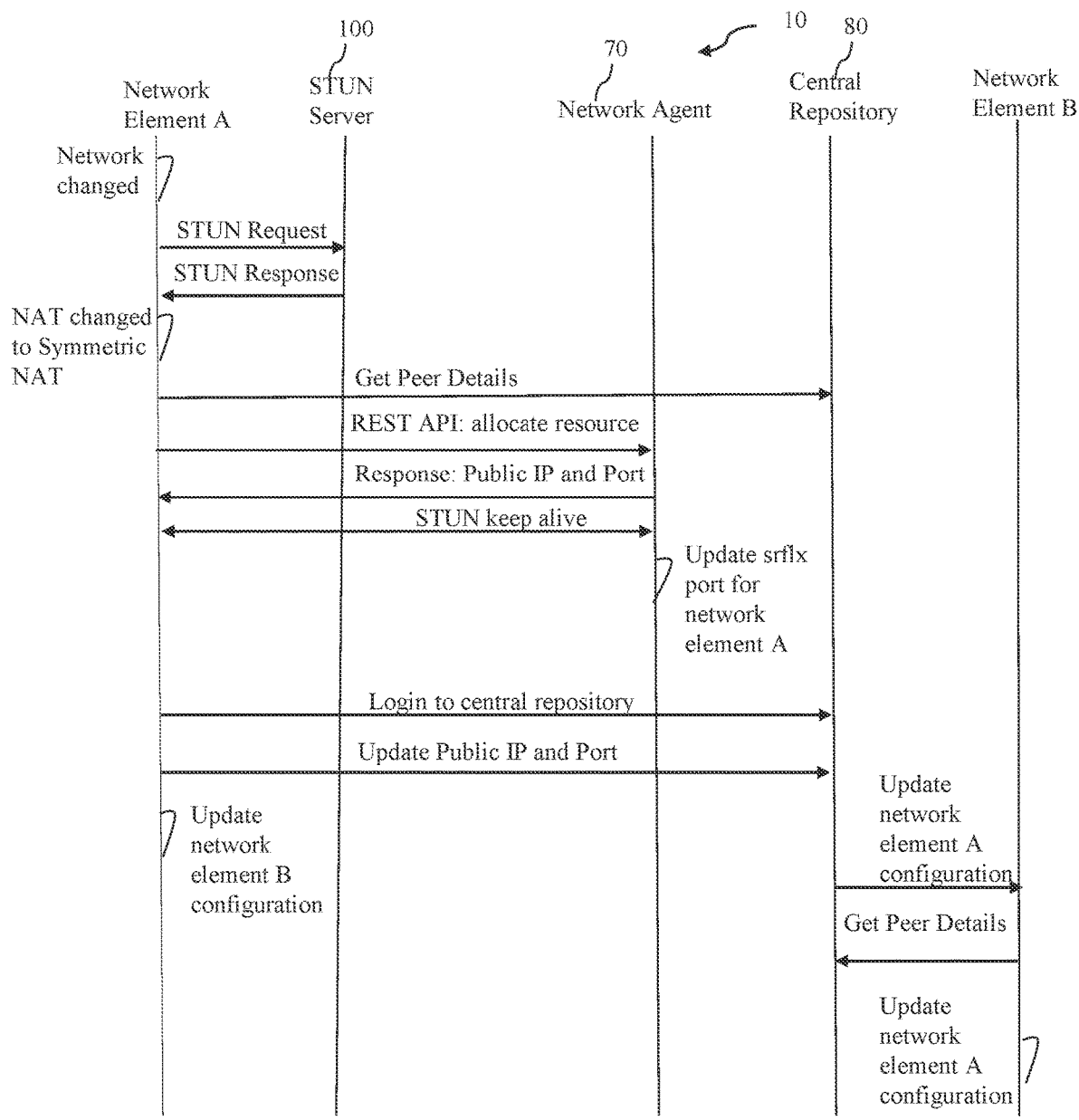
FIG. 6(a) and FIG. 6(b) illustrates schematic representation of one embodiment of the system of FIG. 1, depicting sequence of events required to be executed to handle NAT change such as upgrade scenario in accordance with an embodiment of the present disclosure.
Figure 6B:
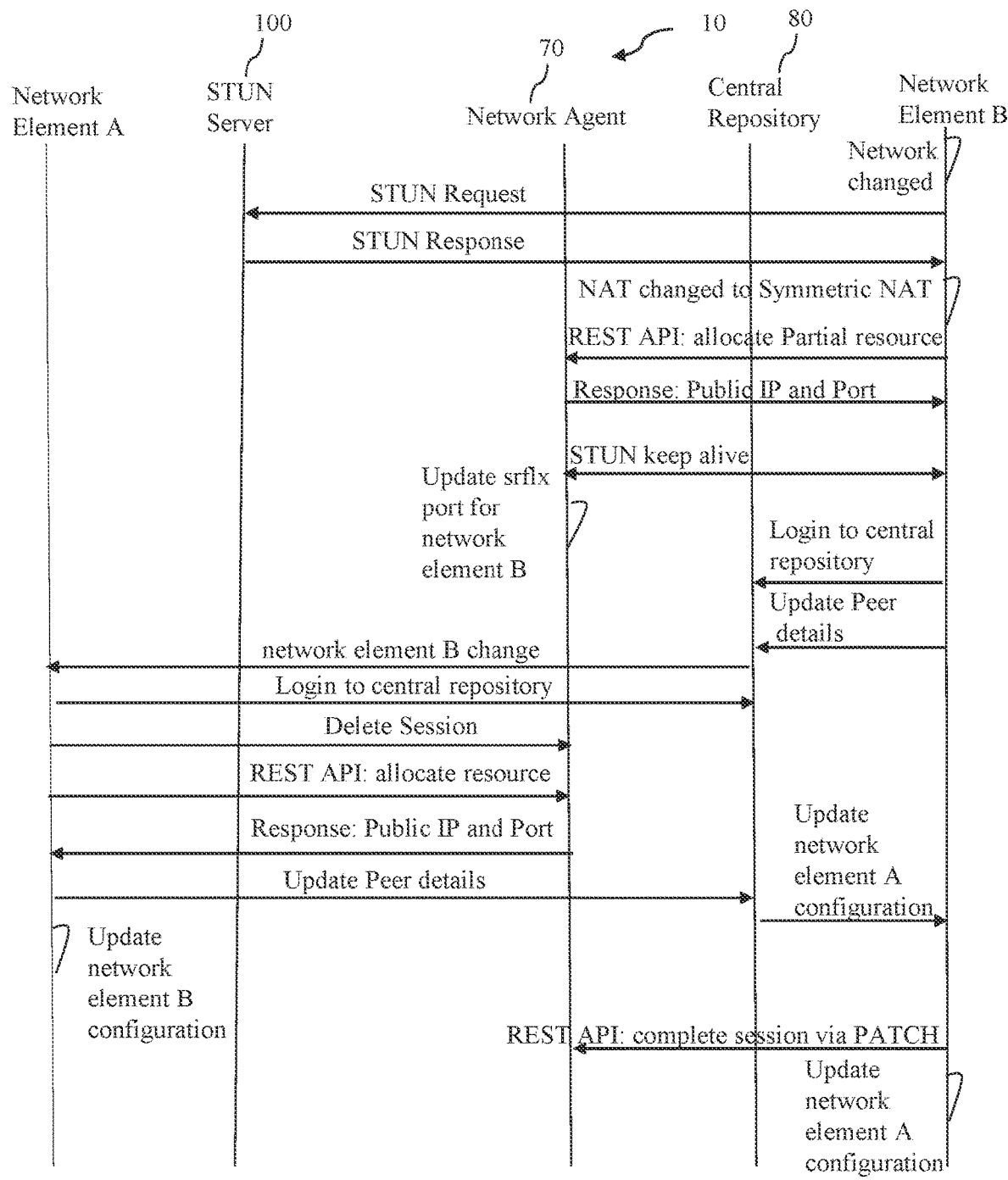

FIG. 6(a) and FIG. 6(b) illustrates schematic representation of one embodiment of the system 10 of FIG. 1, depicting sequence of events required to be executed to handle NAT change such as upgrade scenario 103 in accordance with an embodiment of the present disclosure. FIG. 6(a) describe sequence of events that need to be executed to handle NAT change, when a network element's NAT changes from Regular to Symmetric NAT condition. Initially, Peer A on Regular NAT is in communication with Peer B on Regular NAT. Peer A on network change has NAT changed to Symmetric NAT. The network element 22 associated with Peer A will send the peer detail to central repository 80 and send a request to allocate resource to the network element 22. In response, the network agent 70 sends public IP and port details to network element A and the network agent 70 update the srflx (server reflexive) port for network element. As used herein, srflx indicates an intermediary address assigned by the STUN server to represent the peer anonymously. Peers that are connected to a local network do not know the public Internet facing IP of the network, so they ask a STUN server for their public Internet IP and port opened in the router. The network element A updates configuration of network element B and central repository 80 updates the configuration of network element A to the network element B. Further, the central repository 80 will acquire the peer details from network element B and the network element B updates the configuration of network element A.

FIG. 6(b) describes a sequence of events that need to be executed to handle NAT change when Peer A on Symmetric NAT is in communication with Peer B on Regular NAT. Peer B on network change has NAT changed to Symmetric NAT, the network element B sends a request to partially allocate resources to the network agent 70 and in response the network agent shares public IP and port details to the network element B, further, the network agent updates srflx port for network element B. Subsequently, the central repository updates network element A about change in NAT of network element B. The network element A sends a request to allocate resources to the network agent 70 and in response the corresponding public IP and port details are shared with network element A. Once the network element A updates peer details to the central repository, the central repository 80 updates to configuration of network element A to network element B. In response, the network element B shares the complete session via a PATCH request.

Figure 7A:
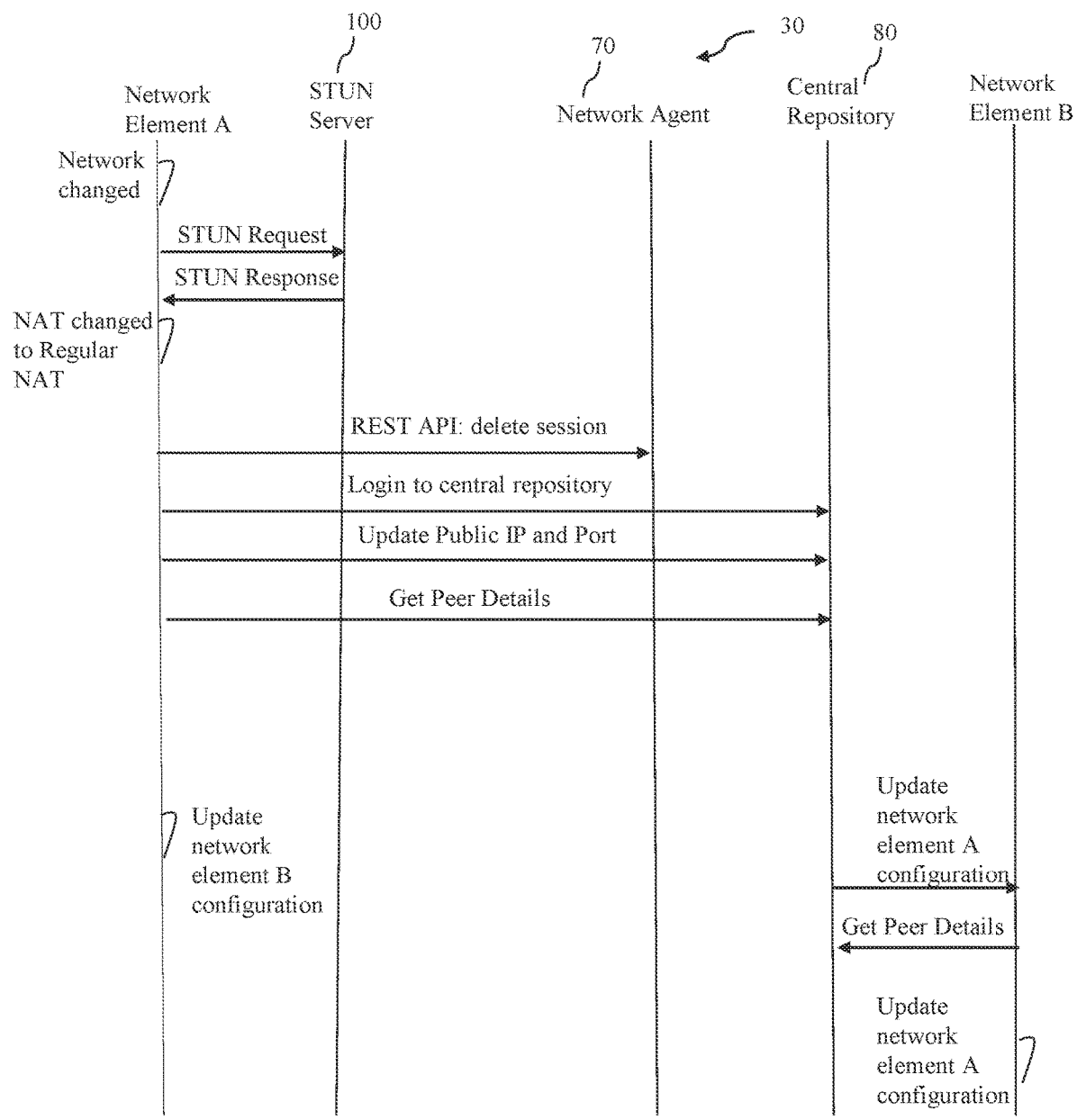
FIG. 7(a) and FIG. 7(b) illustrates schematic representation of one embodiment of the system of FIG. 1, depicting sequence of events required to be executed to handle NAT change such as downgrade scenario in accordance with an embodiment of the present disclosure.
Figure 7B:
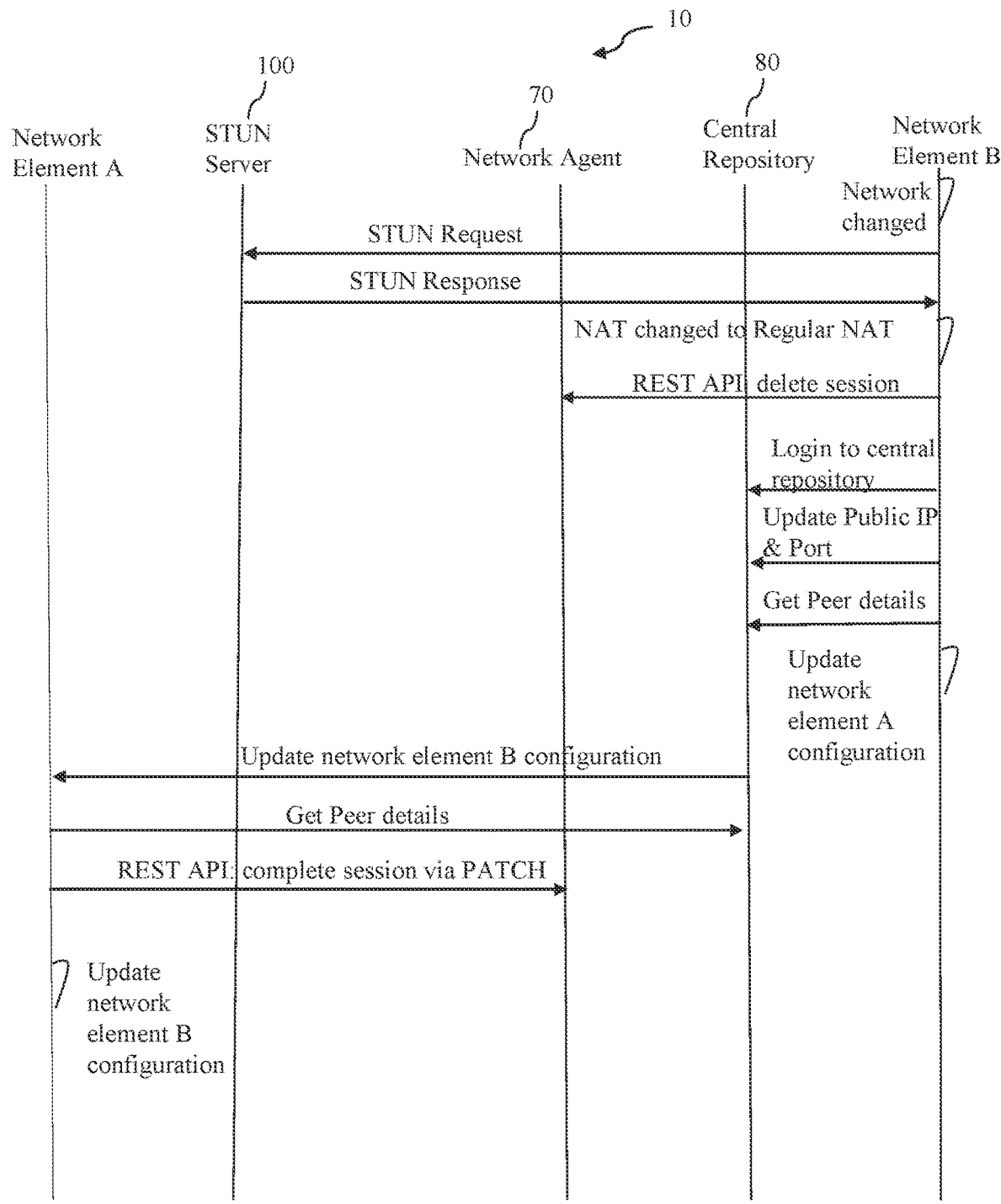

FIG. 7(a) and FIG. 7(b) illustrates schematic representation of one embodiment of the system 10 of FIG. 1, depicting sequence of events required to be executed to handle NAT change such as downgrade scenario 104 in accordance with an embodiment of the present disclosure. FIG. 7(a) describe depicting sequence of events required to be executed to handle NAT change when Peer A on Symmetric NAT is in communication with Peer B on Regular NAT. Peer A on network change has NAT changed to Regular NAT. The network element A delete the ongoing session by sending the request to network agent 70 and updates the public IP and port details to the central repository 80 to provide peer details. The network element A updates the configurations of network element B and consequently the central repository 80 will update configuration of network element A to network element B, where the network element B provides the peer details to central repository 80 and updates the configuration of network element A.

FIG. 7(b) describe depicting sequence of events required to be executed to handle NAT change when Peer A on symmetric NAT is in communication with Peer B on symmetric NAT. Peer B on network change has NAT changed to Regular NAT. The network element B delete the ongoing session by sending the request to network agent 70 and updates the public IP and port details to the central repository 80 to provide peer details. The network element B updates the configurations of network element A and consequently the central repository 80 will update configuration of network element B to network element A, where the network element A provides the peer details to central repository 80 and complete session via a PATCH request.

Figure 8:
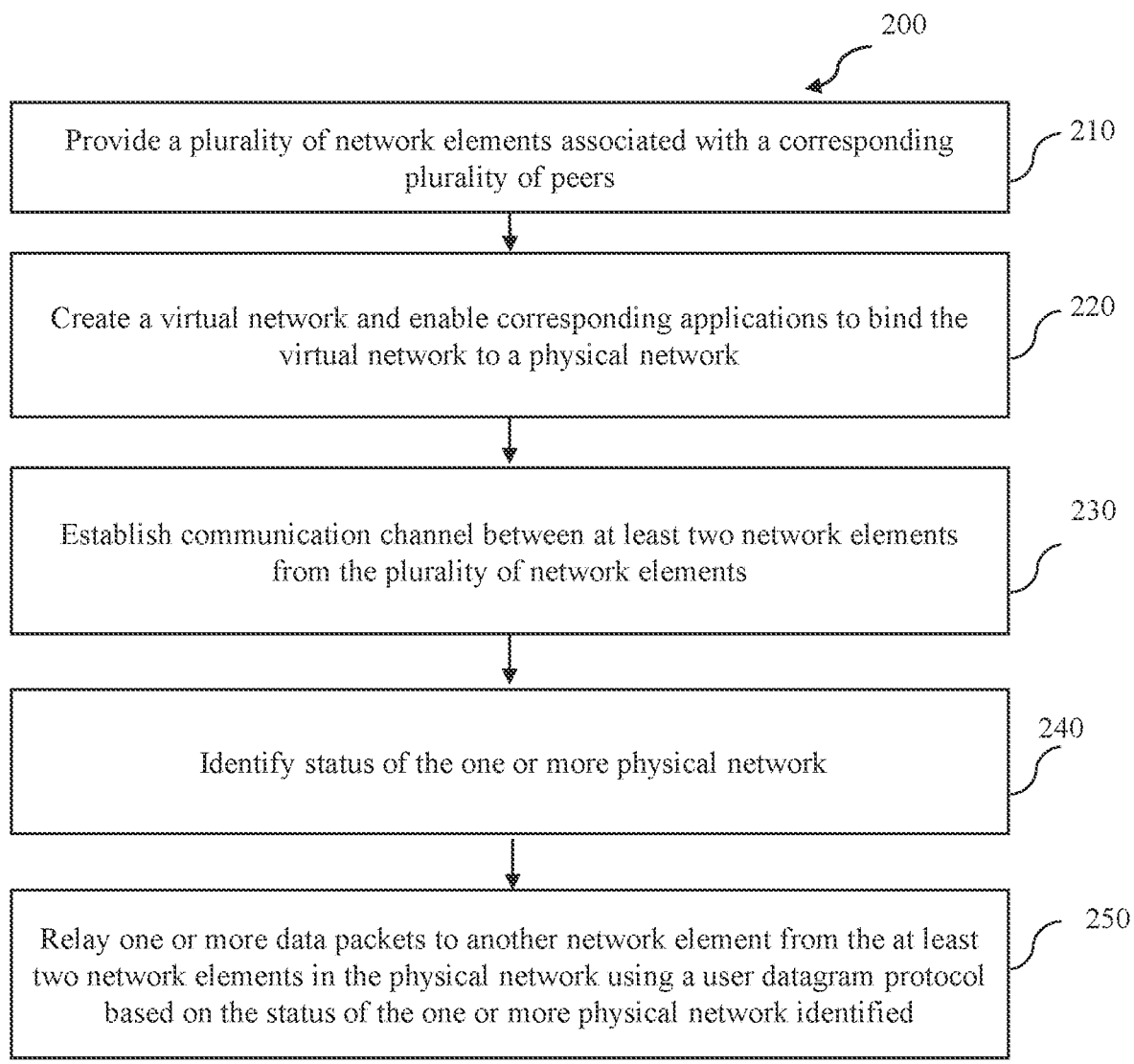
FIG. 8 is a flow chart representing the steps involved in a method an independent binding of virtual networks overlay using a physical network topology in accordance with an embodiment of the present disclosure.

FIG. 8 is a flow chart representing the steps involved in a method 200 an independent binding of virtual networks overlay using a physical network topology in accordance with an embodiment of the present disclosure. The method 200 includes providing a plurality of network elements associated with a corresponding plurality of peers in step 210. The method 200 also includes creating a virtual network and enable corresponding applications to bind the virtual network to a physical network in step 220. In one embodiment, creating a virtual network and enable corresponding applications to bind the virtual network to a physical network by a plurality of network elements. The method 200 further includes establishing communication channel between at least two network elements from the plurality of network elements in step 230. In one embodiment, establishing communication channel between at least two network elements by a network agent. The method 200 further includes identifying status of the one or more physical network in step 240. In one embodiment, identifying status of the one or more physical network by a network element from a set of at least two network elements. In a specific embodiment, a set of at least two network elements are configured to perform a client server protocol request to a client server to obtain one or more physical network characteristics. In such an embodiment, the one or more physical network characteristics may include public IP/port address, types of network address translator (NATs) or port addressal translator (PATs). Subsequently, in one embodiment, the method includes registering, by the plurality of network elements, with a central repository via a signaling protocol. In such an embodiment, the signaling protocol may include REST, web sockets, SIP or XMPP. In some embodiments, the central repository is configured to track registration of the plurality of network elements for discovery and connectivity. In one embodiment, the applications corresponding to the plurality of network elements are communicating with each other using the physical network.

The method 200 further includes relaying one or more data packets to another network element from a set of at least two network elements in the physical network using a user datagram protocol based on the status of the one or more physical network identified in step 250. In one embodiment, relaying one or more data packets to another network element in the physical network by the network element from a set of at least two network elements. In such an embodiment, the network element of the at least network elements is configured to relay one or more data packets to another network element from a set of at least two network elements when the status includes an unrestricted path.

In one embodiment, when the status includes port restricted path, restricted path or symmetric path, the method includes sending, by the network element, a resource allocation request to the network agent for another network element from a set of at least two network elements upon receiving acknowledgement of the registration request. In such an embodiment, the method includes obtaining a physical address mapped between a set of at least two network elements by the network agent upon obtaining a response of the resource allocation request from the network agent. In some embodiment, the method includes encapsulate the one or more packets in user datagram protocol (UDP), by utilizing the physical address, as a payload. In such an embodiment, the method includes relay one or more data packets, by using the physical network, to another network element from a set of at least two network elements, wherein each of the set of at least two network elements strip and relay the payload to the corresponding application for communication to be established. In one embodiment, the network element obtains a binding address for relaying the one or more data packets associated with another network element, where the binding address enables security to authorize the set of at least two network elements for communicating via a channel.

Figure 9:
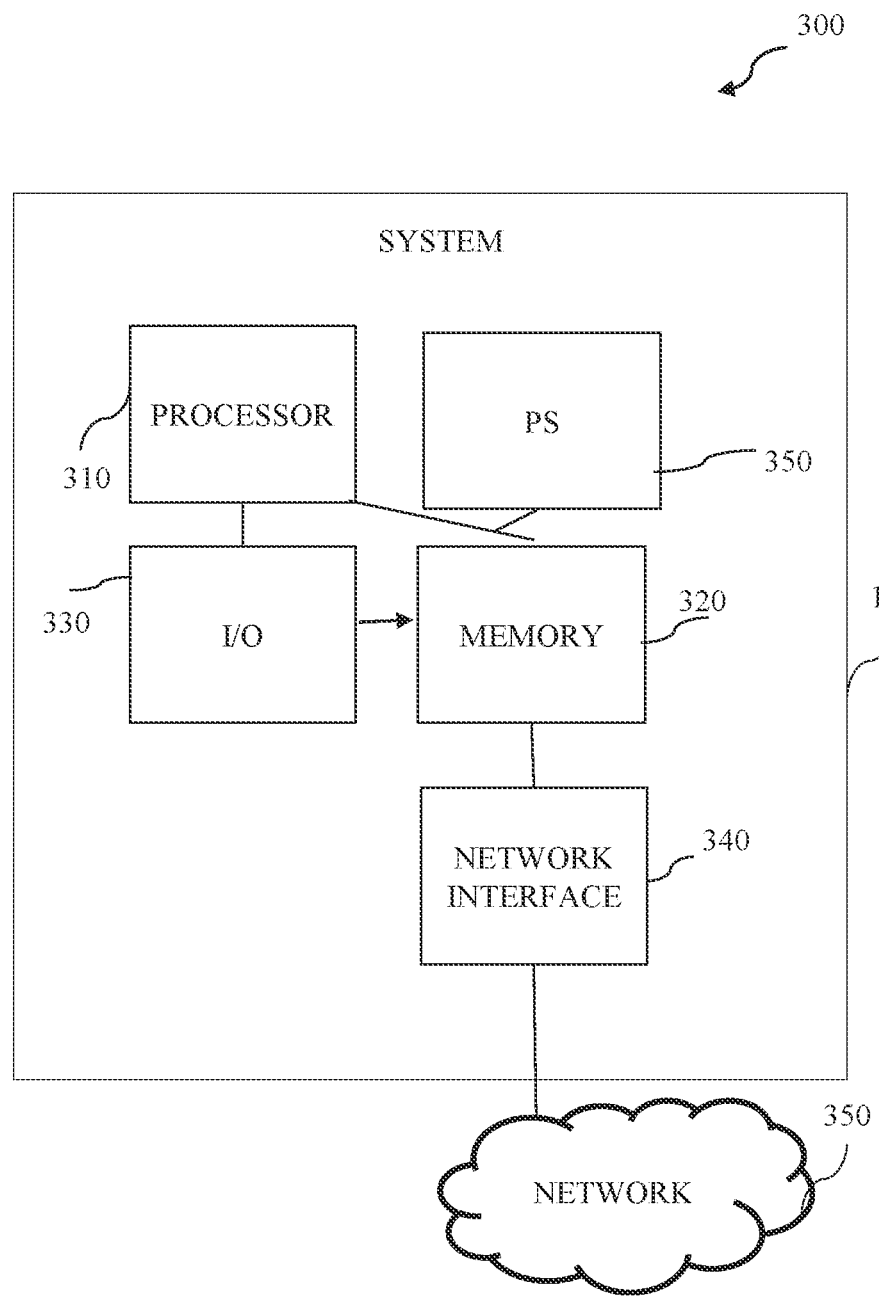
FIG. 9 is a block diagram representation of one embodiment of a device which is one example of a portion or all of the server of FIG. 1, as well as other clients and servers described in other embodiments.

FIG. 9 is a block diagram representation of one embodiment of a device 300 which is one example of a portion or all of the server 100 of FIG. 1, as well as other clients and servers described in other embodiments. The system 10 may include a controller (e.g., a processor/central processing unit ("PROCESSOR")) 310, a memory unit 320, an input/output ("I/W") device 330, and a network interface 340. The components 310, 320, 330, and 340 are interconnected by a data transport system 10. A power supply (PS) 350 may provide power to components of the system 10 via a power transport system.

It is understood that the system 10 may be differently configured and that each of the listed components may actually represent several different components. For example, the CPU 310 may actually represent a multi-processor or a distributed processing system. The memory unit 320 may include different levels of cache memory, main memory, hard disks, and remote storage locations. The I/O device 330 may include monitors, keyboards, and the like. The network interface 340 may include one or more network cards providing one or more wired and/or wireless connections to a network 350. Therefore, a wide range of flexibility is anticipated in the configuration of the system 10, which may range from a single physical platform configured primarily for a single user or autonomous operation to a distributed multi-user platform such as a cloud computing system.

The system 10 may use any operating system (or multiple operating systems), including various versions of operating systems, personal computers, servers, and other computing platforms depending on the use of the system 10. The operating system, as well as other instructions (e.g., for telecommunications and/or other functions provided by the device 300), may be stored in the memory unit 310 and executed by the processor 310. For example, if the system 10 is the device 10, the memory unit 320 may include instructions for performing some or all of the steps, process, and methods described herein.

The network 350 may be a single network or may represent multiple networks, including networks of different types, whether wireless or wireline. For example, the device 10 may be coupled to external devices via a network that includes a cellular link coupled to a data packet network or may be coupled via a data packet link such as a wide local area network (WLAN) coupled to a data packet network or a Public Switched Telephone Network (PSTN).

Accordingly, many different network types and configurations may be used to couple the device 10 with external devices.

Various embodiments of the system and method for an independent binding of virtual networks overlay using a physical network topology as described above enables a mechanism to solve the problem of application interactivity introducing single point of failures without the need for applications to make any changes to their existing code base to solve the problem if connectivity, avoid single point of failure and the ability to independently traverse NATs without minimal changes to existing solution architecture. The network elements use the physical network, encapsulates the data packets in UDP as a payload and uses the physical network to relay packets to another network element. Each network element strips the payload and relays it to the application that requires the communication. Applications are not being modified in any manner to achieve this functionality.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for an independent binding of virtual networks overlay using a physical network topology comprising:
 a plurality of network elements associated with a corresponding plurality of peers, wherein the plurality of network elements is configured to create a virtual network and enable a corresponding application to bind the virtual network to a physical network;
 a network agent configured to establish a communications channel between at least two network elements from the plurality of network elements,
 wherein a network element from the set of at least two network elements is configured to:
  perform a client server protocol request to a client server to obtain one or more physical network characteristics;
  identify a status of the one or more physical network characteristics;
  relay one or more data packets to another network element from a set of at least two network elements when the status comprises port restricted path, restricted path or symmetric path;
  send a registration request to central repository via a signaling protocol when the status comprises the restricted path;
  send a resource allocation request to the network agent for another network element from the set of at least two network elements upon receiving acknowledgement of the registration request;
  obtain a physical address mapped between the set of at least two network elements by the network agent upon obtaining a response of the resource allocation request from the network agent;
  encapsulate the one or more packets in UDP, by utilizing the physical address, as a payload; and
  relay one or more data packets, by using the physical network, to another network element from a set of at least two network elements, wherein each of the set of at least two network elements strip and relay the payload to the corresponding application for communications to be established.

2. A method comprising:
 providing a plurality of network elements associated with a corresponding plurality of peers;
 creating, by a plurality of network elements, a virtual network and enable corresponding applications to bind the virtual network to a physical network;
 establishing, by a network agent, a communications channel between at least two network elements from the plurality of network elements;
 identifying, by a network element from the set of at least two network elements, a status of the one or more physical network;
 relaying, by the network element from the set of at least two network elements, one or more data packets to another network element from the set of at least two network elements in the physical network using a user datagram protocol based on the status of the one or more physical network identified;
 sending a registration request to central repository via a signaling protocol when the status comprises the restricted path;
 sending a resource allocation request to the network agent for another network element from the set of at least two network elements upon receiving acknowledgement of the registration request;
 obtaining a physical address mapped between the set of at least two network elements by the network agent upon obtaining a response of the resource allocation request from the network agent;
 encapsulating the one or more packets in UDP, by utilizing the physical address, as a payload; and
 relaying one or more data packets, by using the physical network, to another network element from a set of at least two network elements, wherein each of the set of at least two network elements strip and relay the payload to the corresponding application for communications to be established.

3. The method of claim 2, wherein relaying the one or more data packets comprises obtaining a binding address for relaying the one or more data packets associated with another network element, wherein the binding address enables security to authorize the set of at least two network elements for communicating via a channel.

4. The method of claim 2, further comprising establishing a set of rules of engagement of the at set of least two network elements for establishing communications by each of the plurality of network elements in conjunction with a central repository.

5. The system of claim 1, wherein a set of at least two network elements are configured to perform a client server protocol request to a client server to obtain one or more physical network characteristics, wherein the one or more physical network characteristics comprises public IP/port address, types of network address translators (NATs), and port address translators (PATs).

6. The system of claim 1, wherein the plurality of network elements is configured to register with a central repository via a signaling protocol, wherein the signaling protocol comprises at least one of a REST, web sockets, SIP, and XMPP.

7. The system of claim 6, wherein the central repository is configured to track registration of the plurality of network elements for discovery and connectivity.

8. The system of claim 1, wherein the applications corresponding to the plurality of network elements are communicating with each other using the physical network.

9. The system of claim 1, wherein the network elements of a set of at least two network elements is configured to relay one or more data packets to another network element from the set of at least two network elements when the status comprises an unrestricted path.

10. The system of claim 1, wherein the status comprises at least one of a port restricted path, a restricted path, and a symmetric path, and wherein the network element from the set of at least two network elements is configured to:
 send a resource allocation request to the network agent for another network element from a set of at least two network elements upon receiving acknowledgement of the registration request;
 obtain a physical address mapped between the set of at least two network elements by the network agent upon obtaining a response of the resource allocation request from the network agent;

encapsulate the one or more packets in user datagram protocol (UDP), by utilizing the physical address, as the payload; and relay one or more data packets, by using the physical network, to another network element from a set of at least two network elements, wherein each of the set of at least two network elements strip and relay the payload to the corresponding application for communications to be established.

11. The system of claim 1, wherein the network element is configured to obtain a binding address for relaying the one or more data packets associated with another network element, wherein the binding address enables security to authorize the set of at least two network elements for communicating via a channel.

12. The system of claim 1, wherein each of the plurality of network elements in conjunction with a central repository is configured to establish a set of rules, wherein the set of rules is associated with selection of the set of at least two network elements from the plurality of network elements for establishing communications between the set of at least two network elements.

13. The system of claim 1, wherein each of the plurality of network elements is configured to inform the network agent about a change in the physical address of a network element from the plurality of network elements when the physical network of a corresponding network element is changed.

14. The system of claim 13, wherein the network agent is configured to make changes in a state machine corresponding to the change in the physical network to allow for an updated physical address to be used for communications and purge a previous mapping.

* * * * *